United States Patent
Weaver et al.

(10) Patent No.: US 9,972,442 B2
(45) Date of Patent: May 15, 2018

(54) WET ELECTROLYTIC CAPACITOR

(71) Applicant: AVX Corporation, Fountain Inn, SC (US)

(72) Inventors: Mitchell D. Weaver, Simpsonville, SC (US); Zebbie Lynn Sebald, Myrtle Beach, SC (US)

(73) Assignee: AVX Corporation, Fountain Inn, SC (US)

( * ) Notice: Subject to any disclaimer, the term of this patent is extended or adjusted under 35 U.S.C. 154(b) by 407 days.

(21) Appl. No.: 14/210,591

(22) Filed: Mar. 14, 2014

(65) Prior Publication Data
US 2014/0268497 A1    Sep. 18, 2014

Related U.S. Application Data (60) Provisional application No. 61/787,116, filed on Mar. 15, 2013.

(51) Int. Cl.
| | |
|---|---|
| *H01G 9/008* | (2006.01) |
| *H01G 9/052* | (2006.01) |
| *H01G 9/10* | (2006.01) |
| *H01G 9/14* | (2006.01) |
| H01G 9/145 | (2006.01) |

(52) U.S. Cl.
CPC ............. *H01G 9/008* (2013.01); *H01G 9/052* (2013.01); *H01G 9/10* (2013.01); *H01G 9/14* (2013.01); H01G 9/145 (2013.01)

(58) Field of Classification Search
CPC ...... H01G 9/012; H01G 9/015; H01G 9/0029; H01G 9/028; H01G 9/045
USPC .......................... 361/504, 508, 509, 516–519
See application file for complete search history.

(56) References Cited

U.S. PATENT DOCUMENTS

| | | | |
|---|---|---|---|
| 2,280,789 A | 4/1942 | Brennan | |
| 2,578,667 A * | 12/1951 | Brennan | ................ H01G 9/02 |
| | | | 118/314 |
| 2,628,271 A | 2/1953 | Brafman | |
| 4,017,302 A | 4/1977 | Bates et al. | |
| 4,025,827 A | 5/1977 | Pellerin et al. | |
| 4,035,905 A | 7/1977 | Clement | |
| 4,281,092 A | 7/1981 | Breazeale | |
| 4,483,819 A | 11/1984 | Albrecht et al. | |
| 4,555,268 A | 11/1985 | Getz | |
| 4,780,797 A | 10/1988 | Libby | |

(Continued)

FOREIGN PATENT DOCUMENTS

| | | |
|---|---|---|
| CN | 101494120 | 7/2009 |
| GB | 2 483 748 A | 3/1921 |

(Continued)

OTHER PUBLICATIONS

Product Information on DuPont™ Kalrez® Perfluoroelastomer Parts, 2014, 2 page.

(Continued)

*Primary Examiner* — Nguyen Ha
(74) *Attorney, Agent, or Firm* — Dority & Manning, P.A.

(57) ABSTRACT

A wet electrolytic capacitor that contains electrodes (i.e., anode and cathode) and a working electrolyte is provided. The anode and optionally the cathode include a wire assembly containing two or more individual wires. A particulate material is also disposed in contact with at least a portion of the wire assembly.

25 Claims, 3 Drawing Sheets

(56) References Cited

U.S. PATENT DOCUMENTS

| | | | |
|---|---|---|---|
| 4,942,500 A | 7/1990 | Libby et al. | |
| 4,992,910 A | 2/1991 | Evans | |
| 5,043,849 A | 8/1991 | Libby | |
| 5,082,491 A | 1/1992 | Rerat | |
| 5,098,485 A | 3/1992 | Evans | |
| 5,137,771 A | 8/1992 | Lofe et al. | |
| 5,369,547 A | 11/1994 | Evans | |
| 5,400,211 A | 3/1995 | Evans | |
| 5,469,325 A | 11/1995 | Evans | |
| 5,559,667 A | 9/1996 | Evans | |
| 5,716,511 A | 2/1998 | Melody et al. | |
| 5,737,181 A | 4/1998 | Evans | |
| 5,754,394 A | 5/1998 | Evans et al. | |
| 5,786,980 A | 7/1998 | Evans | |
| 5,788,216 A | 8/1998 | Pittman et al. | |
| 5,798,906 A * | 8/1998 | Ando | H01G 9/10 361/517 |
| 5,894,403 A | 4/1999 | Shah et al. | |
| 5,926,362 A | 7/1999 | Muffoletto et al. | |
| 5,954,856 A | 9/1999 | Pathare et al. | |
| 5,982,609 A | 11/1999 | Evans | |
| 6,094,339 A | 7/2000 | Evans | |
| 6,162,345 A | 12/2000 | Kinard et al. | |
| 6,219,222 B1 | 4/2001 | Shah et al. | |
| 6,231,993 B1 | 5/2001 | Stephenson et al. | |
| 6,238,456 B1 | 5/2001 | Wolf et al. | |
| 6,346,185 B1 | 2/2002 | Kinard et al. | |
| 6,576,038 B1 | 6/2003 | Rao | |
| 6,576,524 B1 | 6/2003 | Evans et al. | |
| 6,594,140 B1 | 7/2003 | Evans et al. | |
| 6,659,283 B1 | 12/2003 | Muffoletto et al. | |
| 6,687,117 B2 | 2/2004 | Liu et al. | |
| 6,707,660 B1 | 3/2004 | Evans et al. | |
| 6,721,169 B2 | 4/2004 | Melody et al. | |
| 6,721,170 B1 | 4/2004 | Evans et al. | |
| 6,740,420 B2 | 5/2004 | Muffoletto et al. | |
| 6,802,951 B2 | 10/2004 | Hossick-Schott | |
| 6,965,510 B1 | 11/2005 | Liu et al. | |
| 7,002,790 B2 | 2/2006 | Hossick-Schott et al. | |
| 7,038,901 B2 | 5/2006 | Muffoletto et al. | |
| 7,116,548 B2 | 10/2006 | Satterfield, Jr. et al. | |
| 7,206,186 B1 | 4/2007 | Knight et al. | |
| 7,224,576 B2 | 5/2007 | Hossick-Schott | |
| 7,256,982 B2 | 8/2007 | Lessner et al. | |
| 7,271,994 B2 | 9/2007 | Stemen et al. | |
| 7,314,685 B2 | 1/2008 | Brown et al. | |
| 7,342,774 B2 | 3/2008 | Hossick-Schott et al. | |
| 7,410,509 B2 | 8/2008 | Eberhard et al. | |
| 7,515,396 B2 | 4/2009 | Biler | |
| 7,667,954 B2 | 2/2010 | Lessner et al. | |
| 7,718,736 B2 | 5/2010 | Park et al. | |
| 7,727,372 B2 | 6/2010 | Liu et al. | |
| 7,731,893 B2 | 6/2010 | Freeman et al. | |
| 7,837,743 B2 | 11/2010 | Gaffney et al. | |
| 7,864,507 B2 | 1/2011 | Fleig et al. | |
| 7,879,217 B2 | 2/2011 | Goad et al. | |
| 7,929,274 B2 | 4/2011 | Reed et al. | |
| 7,952,853 B2 | 5/2011 | Viste et al. | |
| 8,023,250 B2 | 9/2011 | Ning et al. | |
| 8,081,419 B2 * | 12/2011 | Monroe | H01G 4/232 29/25.03 |
| 8,259,435 B2 | 9/2012 | Millman et al. | |
| 8,279,585 B2 | 10/2012 | Dreissig et al. | |
| 8,288,005 B2 | 10/2012 | Manzara et al. | |
| 8,298,478 B2 | 10/2012 | Hintz et al. | |
| 8,313,621 B2 | 11/2012 | Goad et al. | |
| 8,405,956 B2 | 3/2013 | Dreissig et al. | |
| 8,451,586 B2 | 5/2013 | Priban | |
| 8,514,547 B2 | 8/2013 | Galvagni et al. | |
| 8,605,411 B2 | 12/2013 | Biler et al. | |
| 8,675,348 B2 | 3/2014 | Viste et al. | |
| 8,687,347 B2 | 4/2014 | Bates et al. | |
| 8,741,214 B2 | 6/2014 | Evans | |
| 2004/0243183 A1 | 12/2004 | Norton et al. | |
| 2005/0270725 A1 * | 12/2005 | Hahn | H01G 9/012 361/533 |
| 2006/0091020 A1 | 5/2006 | Hossick-Schott et al. | |
| 2006/0191796 A1 | 8/2006 | Muffoletto et al. | |
| 2007/0221507 A1 | 9/2007 | Liu et al. | |
| 2008/0007894 A1 | 1/2008 | Seitz et al. | |
| 2008/0013257 A1 | 1/2008 | Seitz et al. | |
| 2008/0085451 A1 | 4/2008 | Freitag et al. | |
| 2009/0015988 A1 * | 1/2009 | Kuriyama | H01G 9/012 361/523 |
| 2009/0035652 A1 | 2/2009 | Freitag et al. | |
| 2009/0081552 A1 | 3/2009 | Shah et al. | |
| 2009/0103243 A1 * | 4/2009 | Mizukoshi | H01G 9/012 361/523 |
| 2009/0117457 A1 | 5/2009 | Davis et al. | |
| 2010/0148128 A1 | 6/2010 | Shah et al. | |
| 2010/0155645 A1 | 6/2010 | Liu et al. | |
| 2010/0268292 A1 | 10/2010 | Eidelman et al. | |
| 2010/0318140 A1 | 12/2010 | Hintz et al. | |
| 2011/0051317 A1 * | 3/2011 | Fujimoto | H01G 9/012 361/512 |
| 2012/0069490 A1 | 3/2012 | Biler et al. | |
| 2012/0069491 A1 | 3/2012 | Biler | |
| 2012/0127632 A1 | 5/2012 | Evans et al. | |
| 2013/0141841 A1 | 6/2013 | Dreissig et al. | |
| 2013/0155580 A1 | 6/2013 | Karnik et al. | |
| 2013/0242464 A1 | 9/2013 | Biler et al. | |
| 2013/0242465 A1 | 9/2013 | Weaver et al. | |
| 2013/0242466 A1 | 9/2013 | Masheder et al. | |
| 2013/0242467 A1 | 9/2013 | Biler | |
| 2013/0242468 A1 | 9/2013 | Pinwill et al. | |

FOREIGN PATENT DOCUMENTS

| | | |
|---|---|---|
| GB | 2 248 526 A | 4/1992 |
| GB | 2 435 960 A | 9/2007 |
| GB | 2 447 724 A | 9/2008 |
| GB | 2 447 726 A | 9/2008 |
| GB | 2 483 747 A | 3/2012 |
| GB | 2 483 749 A | 3/2012 |
| GB | 2 498 066 a | 7/2013 |
| GB | 2 500 987 A | 10/2013 |
| GB | 2 500 988 A | 10/2013 |
| GB | 2 500 989 A | 10/2013 |
| GB | 2 500 990 A | 10/2013 |
| GB | 2 500 991 A | 10/2013 |
| JP | H 02254108 | 10/1990 |
| JP | 2009158579 | 7/2009 |

OTHER PUBLICATIONS

GB Search Report for GB1403436.7 dated Jul. 28, 2014, 3 pages.
Related Application Form.
Communication of a Preliminary Search Report with Compulsory Response dated May 25, 2016, 4 pages.
Jan Petrzilek, U.S. Appl. No. 14/027,307, filed Sep. 16, 2013, Wet Electrolytic Capacitor Containing a Hydrogen Protection Layer.
Mitchell D. Weaver, U.S. Appl. No. 14/210,620, filed Mar. 14, 2014, Wet Electrolytic Capacitor for Use at High Temperatures.
Jan Petrzilek, U.S. Appl. No. 14/027,309, filed Sep. 16, 2013, Wet Electrolytic Capacitor Containing a Composite Coating.
Petrzilek et al., U.S. Appl. No. 14/027,321, filed Sep. 16, 2013, Electro-Polymerized Coating for a Wet Electrolytic Capacitor.
Examination Report for GB1403436.7 dated Aug. 21, 2017, 5 pages.

* cited by examiner

WET ELECTROLYTIC CAPACITOR

RELATED APPLICATIONS

The present application claims priority to U.S. Provisional Application Ser. No. 61/787,116 (filed on Mar. 15, 2013) and which is incorporated herein in its entirety by reference thereto.

BACKGROUND OF THE INVENTION

High voltage electrolytic capacitors are employed as energy storage reservoirs in many applications. These capacitors are required to have a high energy density because it is desirable to minimize the overall size of the device. Metal foils (e.g., aluminum foil) are often used in high voltage electrolytic capacitors due to their small size. Because the electrostatic capacitance of the capacitor is proportional to its electrode area, the surface of the metallic foil may be, prior to the formation of the dielectric film, roughened or subjected to a chemical conversion to increase its effective area. The capacitance of the electrolytic capacitor is determined by the extent of roughing (the surface area) of the anode foil and the thickness and the dielectric constant of the oxide film. Due to the limited surface area that may be provided by etching metallic foils, attempts have also been made to employ porous sintered pellets in wet electrolytic capacitors—i.e., "wet tantalum" capacitors. A tantalum pellet, for instance, may be formed by compressing a powder under high pressure and sintering at high temperature to form a sponge-like structure, which is very strong and dense but also highly porous. The porosity of the resulting tantalum pellet provides a large internal surface area. Despite its high surface area, however, tantalum pellets may still present high equivalent series resistance ("ESR") and sensitivity of the capacitance to frequency, particularly at high voltages.

As such, a need currently exists for an improved wet electrolytic capacitor.

SUMMARY OF THE INVENTION

In accordance with one embodiment of the present invention, a wet electrolytic capacitor is disclosed that comprises an anode, cathode, and fluidic working electrolyte in communication with the anode and the cathode. The anode includes a wire assembly containing two or more individual wires. A particulate material is disposed in contact with at least a portion of the wire assembly, the particulate material being formed from a valve metal composition.

In accordance with another embodiment of the present invention, an electrode for a wet electrolytic capacitor is disclosed. The electrode comprises a substrate connected to a wire assembly containing a group of first wires oriented in a first direction and a group of second wires oriented in a second direction. A particulate material is disposed over the substrate so that it is in contact with at least a portion of the wire assembly, the particulate material being formed from a valve metal composition.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a wet electrolytic capacitor that contains electrodes (i.e., anode and cathode) and a working electrolyte. In accordance with the present invention, the anode and optionally the cathode include a wire assembly containing two or more individual wires. A particulate material is also disposed in contact with at least a portion of the wire assembly. In one embodiment, for example, the wire assembly may be a mesh-like structure that contains two or more wires oriented in a first direction and two or more wires oriented in a second direction that is substantially perpendicular to the first direction. Regardless of its particular configuration, however, the present inventors have discovered that the wire assembly may provide a multitude of benefits to the resulting capacitor. For example, contrary to anodes formed entirely from a metal foil, the wire assembly of the present invention may provide an increased number of electrical contacts, which can result in a reduced ESR, The wire assembly of the present invention is also less likely to exhibit warping during manufacture of the capacitor (e.g., during sintering), which further enhances mechanical stability and electrical performance.

Various embodiments of the present invention will now be described in more detail below.

I. Wire Assembly

The wire assembly may generally contain any number of individual wires desired for achieving the targeted electrical performance of the capacitor. Typically, the assembly employs 2 or more wires, in some embodiments from 3 to 40 wires, in some embodiments from 4 to 30 wires, and in some embodiments, from 6 to 20 wires. Any suitable electrically conductive material may generally be employed to form the wires, such as a metal (e.g., tantalum, niobium, nickel, aluminum, hafnium, titanium, etc.), as well as electrically conductive oxides and/or nitrides of a metal (e.g., niobium oxide). Tantalum is particularly suitable for use in forming the wires. The wires may possess any desired cross-sectional shape, such as circular, elliptical, square, rectangular, etc. Regardless of their particular shape, the wires are typically selected to have a relatively small size and large aspect ratio (ratio of length to width or thickness) to minimize ESR and the likelihood of warping. For example, the wires may have a thickness (e.g., diameter) of from about 20 micrometers to about 1000 micrometers, in some embodiments from about 50 to about 800 micrometers, and in some embodiments, from about 100 to about 600 micrometers. The aspect ratio of the wires may also range from about 2 to about 150, in some embodiments, from about 5 to about 100, and in some embodiments, from about 15 to about 90. It should be understood that the wires need not have the same size and/or shape, and that one or more wires in the electrode may, for instance, have a thickness or length outside of the ranges noted above. As will be discussed in more detail below, for instance, at least one of the wires may have a length greater than other wires so that it may, for example, extend beyond the periphery of the substrate and serve as a lead (e.g., anode or cathode lead) for the particular electrode in which it is employed.

The manner in which the wires are arranged may also vary. For example, in certain embodiments of the present invention, the wires of the assembly may be oriented in substantially the same direction so that adjacent wires are spaced apart and/or in contact with each other. When spaced apart, the distance between adjacent wires may, for instance, range from about 0.1 to about 50 millimeters, in some embodiments from about 0.5 to about 30 millimeters, and in some embodiments, from about 0.8 to about 20 millimeters.

In yet other embodiments of the present invention, wires may be arranged such that they are oriented in different directions. Although not necessarily required, such a multidirectional wire configuration may help optimize the points of electrical contact for reducing ESR. For example, the wire assembly may contain a first wire or group of first wires (e.g., two or more wires) oriented in a first direction and a second wire or group of second wires oriented in a second direction. When a group of wires is provided in a given direction, such wires may be spaced apart and/or in contact as described above. The angle defined between the first direction and the second direction may range, for instance, from about 0° to about 180°, in some embodiments from about 20° to about 150°, in some embodiments from about 60° C. to about 120°, and in some embodiments, from about 80° to about 100° (e.g., about 90°). In one particular embodiment, the wire assembly is a mesh-like structure in which the second direction is substantially perpendicular to the first direction so that the angle is about 90°.

Figure 1:
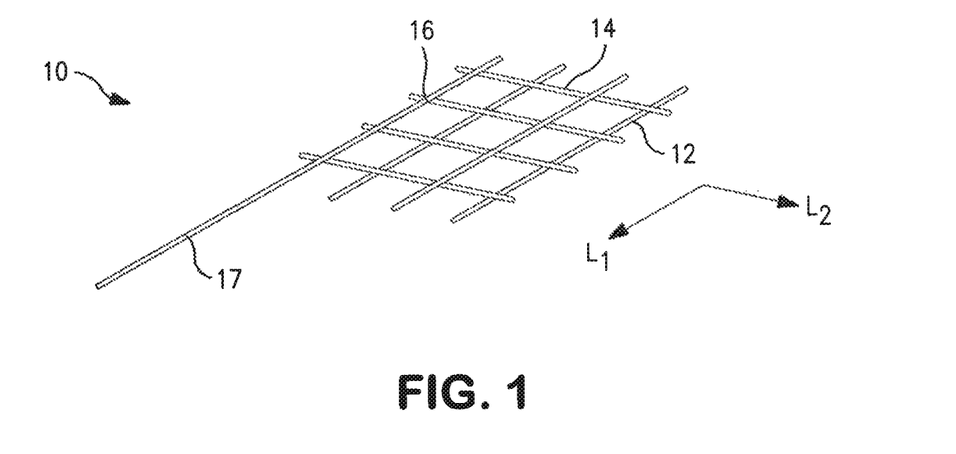
FIG. 1 is a perspective view of one embodiment of a wire assembly that may be employed in the anode of a wet electrolytic capacitor.

Referring to FIG. 1, for example, one embodiment of a wire assembly 10 is shown that is in the form of a mesh-like structure containing a group of first wires 12 oriented in a first direction "$L_1$" and a group of second wires 14 oriented in a second direction "$L_2$", which is substantially perpendicular to the first direction "$L_1$." In the illustrated embodiments, the first wires 12 are spaced apart from each other in the second direction "$L_2$" and the second wires 14 are spaced apart from each other in the first direction "$L_1$." The distance that the wires 12 and/or 14 are spaced apart may vary as described above, such as from about 0.1 to about 50 millimeters, in some embodiments from about 0.5 to about 30 millimeters, and in some embodiments, from about 0.8 to about 20 millimeters. As shown in FIG. 1, the wires 12 contact the wires 14 at a plurality of contact points 16. If desired, the wires may be connected together at the contact points using a variety of techniques, such as by welding, through conductive adhesives, etc. Alternatively, the wires may also be connected together at the contact points during the sintering of the particulate material. The length of the wires 12 and 14 may generally vary as needed for a given application. As shown, one of the wires (e.g., wire 12) may contain a portion 17 that extends beyond the periphery of the substrate so that it serves as a lead (e.g., anode or cathode lead) for the particular electrode in which it is employed.

A variety of techniques may be employed to incorporate the wire assembly into the capacitor. In one embodiment, for example, the wire assembly may simply be inserted into the valve metal composition of the anode (e.g., powder) and pressed therewith, as described in more detail below. Alternatively, the wire assembly may be disposed on and connected to an anode substrate such that the particulate material is also in contact with the substrate, particularly at locations between wires. It should be understood that the assembly need not be formed prior to incorporation into the anode structure (e.g., connection to the substrate). For instance, individual wires of the assembly may be separately connected to a substrate to form the assembly thereon. Alternatively, individual wires may be initially connected together to form the wire assembly, such as shown in FIG. 1, which is then connected to a substrate. Regardless, when such a substrate is employed, the mechanism for connecting the wires to the substrate may vary as is known in the art, such as welding, conductive adhesives, sinter bonding, etc. The substrate on which the wire assembly is disposed may include a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Tantalum and titanium are particularly suitable for use in the present invention. The geometric configuration of the substrate may generally vary as is well known to those skilled in the art, such as in the form of a foil, sheet, screen, etc. The thickness of the substrate is generally small to improve the electrical performance and volumetric efficiency of the resulting capacitor. For example, the thickness of the substrate may be about 1000 micrometers or less, in some embodiments from about 1 to about 500 micrometers, and in some embodiments, from about 5 to about 400 micrometers.

If desired, the substrate and/or wire assembly may be roughened to increase surface area and increase the degree to which a material may be able to adhere thereto. In one embodiment, for example, a surface of the wire assembly is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. In addition to chemical or electrochemical roughening techniques, mechanical roughening may also be employed. For instance, a surface of the wire assembly may be abrasive blasted by propelling a stream of abrasive media (e.g., sand) against at least a portion of a surface thereof.

II. Anode

Figure 2:
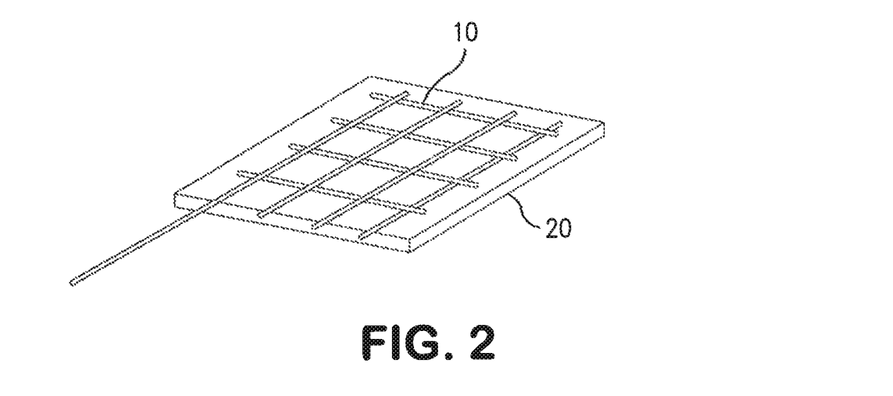
FIG. 2 is a perspective view of one embodiment of an anode that contains the wire assembly of FIG. 1 connected to a substrate.

As indicated above, the anode of the wet electrolytic capacitor generally contains a wire assembly formed in accordance with the present invention. Referring to FIG. 2, for example, one embodiment of an anode is shown that contains the wire assembly connected to an anode substrate 20 (e.g., tantalum). A particulate material is disposed over the anode substrate so that it is in contact with at least a portion of the wire assembly. The particulate material may also be in contact with the anode substrate, particularly at locations between the wires.

The particulate material of the anode is formed from a valve metal composition. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter: 2005/0103638 to Schnitter, et al.; 2005/0013765 to Thomas, et al.

To form the particulate material, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Any of a variety of milling techniques may be utilized in the present invention to achieve the desired particle characteristics. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting valve metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth.

Although not required, the powder may be agglomerated using any technique known in the art. Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the particles may be passivated by the gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

Regardless of the particular method employed, the powder may possess certain characteristics that enhance its ability to be formed into a particulate material for the anode. For example, the particles may have a specific surface area of from about 0.5 to about 10.0 $m^2/g$, in some embodiments from about 0.7 to about 5.0 $m^2/g$, and in some embodiments, from about 1.0 to about 4.0 $m^2/g$. The term "specific surface area" is defined in more detail above. The bulk density (also known as Scott density) is also typically from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

Certain additional components may also be included in the powder. For example, the powder may be optionally mixed with a binder and/or lubricant to ensure that the particles adequately adhere to each other when pressed. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax™ from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted into a green body using any conventional press device. For example, a press device may be employed that is a single station compaction press containing a die and one or multiple punches. Alternatively, anvil-type compaction press devices may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. Any binder/lubricant in the green body may be removed after pressing by heating it under vacuum at a certain temperature (e.g., from about 50° C. to about 200° C.) for several minutes. Alternatively, the binder/lubricant may also be removed by contacting the green body with an aqueous solution, such as described in U.S. Pat. No. 6,197,252 to Bishop, et al. Thereafter, the resulting particulate material may be sintered to form a porous, integral mass. For example, sintering may be conducted at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 10 minutes to about 50 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The anode may also contain a dielectric formed by anodically oxidizing ("anodizing") the sintered particulate material so that a dielectric layer is formed over and/or within its pores. For example, tantalum (Ta) may be anodized to tantalum pentoxide ($Ta_2O_5$). Typically, anodization is performed by initially applying a solution to the anode, such as by dipping anode into the electrolyte. Aqueous solvents (e.g., water) and/or non-aqueous solvents (e.g., ethylene glycol) may be employed. To enhance conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current may be passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The temperature of the anodizing solution may range from about 10° C. to about 200° C., in some embodiments from about 20° C. to about 150° C., and in some embodiments, from about 30° C. to about 100° C. The resulting dielectric layer may be formed on a surface of the sintered particulate material and within its pores.

Through the use of relatively thin wires, the resulting anode, including the wire assembly, sintered particulate material, dielectric layer, and optional anode substrate, may also have a relatively small thickness. For example, the anode may have a thickness ranging from about 50 micrometers to about 2000 micrometers, in some embodiments from about 100 micrometers to about 1500 micrometers, and in some embodiments, from about 200 micrometers to about 1000 micrometers.

III. Cathode

The cathode of the capacitor generally contains a substrate that is coated with an electrochemically active material. The cathode substrate may be formed from material that is the same or different than those described above for the anode substrate. For example, in one embodiment, an anode substrate may be employed that is formed from tantalum and a cathode substrate may be employed that is formed from titanium or tantalum. The geometric configuration of the cathode substrate may generally vary as is well known to those skilled in the art, such as in the form of a foil, sheet, screen, etc. The thickness of the cathode substrate may likewise range from about 1000 micrometers or less, in some embodiments from about 1 to about 500 micrometers, and in some embodiments, from about 5 to about 400 micrometers. If desired, the cathode substrate may also be roughened in a manner such as described above.

Figure 3:
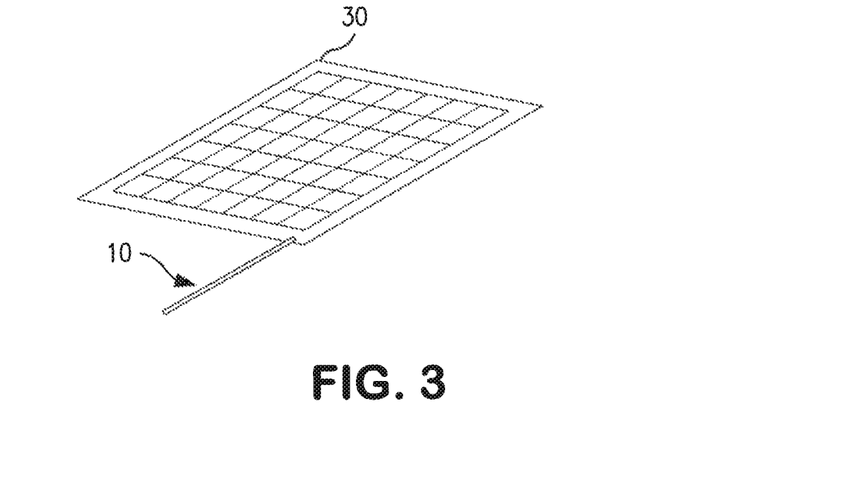
FIG. 3 is a perspective view of one embodiment of a cathode that employs a wire assembly.
Figure 4:
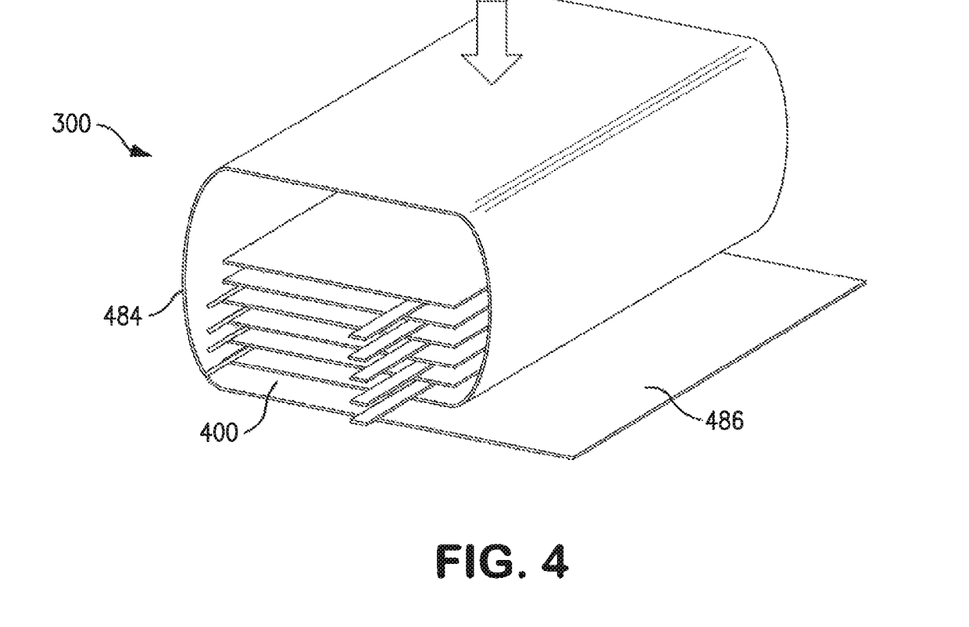
FIG. 4 illustrates one embodiment of a stack of anodes and cathodes prior to being pressed.

Although by no means required, a wire assembly may also be connected to the cathode substrate. Referring to FIG. 3, for example, one embodiment of a cathode is shown that contains a wire assembly 10 connected to a cathode substrate 30 in a manner such as described above. When employed to form the cathode, an electrochemically active particulate material, such as described in more detail below, may be disposed over the cathode substrate so that it is in contact with at least a portion of the wire assembly. The particulate material may also be in contact with the cathode substrate, particularly at locations between the wires. The wire assembly may be formed in a manner such as described above, although it should be understood that the cathode wire assembly need not have the same configuration as anode wire assembly, when employed.

The nature of the electrochemically active material may vary. For example, a particulate material may be employed that includes conductive particles, such as those formed from ruthenium, iridium, nickel, rhodium, rhenium, cobalt, tungsten, manganese, tantalum, niobium, molybdenum, lead, titanium, platinum, palladium, and osmium, as well as combinations of these metals. Non-insulating oxide conductive particles may also be employed. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al. and U.S. Pat. No. 5,858,911 to Wellen, et al.

A conductive polymer coating may also be employed as the electrochemically active material. Such coatings may be particularly suitable in those embodiments in which the wire assembly is not used in the cathode. The conductive polymer coating may be formed from one or more layers. The material employed in such layer(s) may vary. In one embodiment, for example, the material includes conductive polymer(s) that are typically π-conjugated and have electrical conductivity after oxidation or reduction. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Substituted polythiophenes are particularly suitable for use as conductive polymer in that they have particularly good mechanical robustness and electrical performance. In one particular embodiment, the substituted polythiophene has the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_6$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments, from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al. describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese (IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The total target thickness of the electrochemically active coating may generally vary depending on the desired properties of the capacitor. Typically, the coating has a thickness of from about 0.2 micrometers ("μm") to about 50 μm, in some embodiments from about 0.5 μm to about 20 μm, and in some embodiments, from about 1 μm to about 5 μm. Regardless, the resulting cathode, including the substrate, electrochemically active material, and optional wire assembly, may have a relatively small thickness. For example, the cathode may have a thickness ranging from about 50 micrometers to about 2000 micrometers, in some embodiments from about 100 micrometers to about 1500 micrometers, and in some embodiments, from about 200 micrometers to about 1000 micrometers.

IV. Working Electrolyte

The working electrolyte is a fluid that may be impregnated within the anode, or it may be added to the capacitor at a later stage of production. The fluid electrolyte generally uniformly wets the dielectric on the anode. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 15 S/cm, and in some embodiments, from about 0.5 to about 10 S/cm, determined at a temperature of about 23° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt may be "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 8.0, in some embodiments from about 5.0 to about 7.5, and in some embodiments, from about 5.5 to about 7.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc.). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

V. Capacitor Configuration

If desired, the wet electrolytic capacitor of the present invention may contain a single anode and one or more cathodes. To improve electrical performance, however, it is typically desired that the wet electrolytic capacitor employs multiple anodes and/or multiple cathodes, one or more of which contain the wire assembly of the present invention. Any number of anodes and cathodes may generally be employed in the capacitor, such as from 1 to 40, in some embodiments from 2 to 30, and in some embodiments, from 4 to 20 individual anodes and/or cathodes. In one embodiment, for example, the capacitor may employ one anode and two cathodes. In other embodiments, however, the capacitor may employ multiple anodes. Generally speaking, the ability to employ a relatively high number of anodes and cathodes within a given specific volume can significantly reduce the resulting ESR of the capacitor.

The physical arrangement of the anodes and cathodes may vary as is well known in the art. In one embodiment, for example, the capacitor may include anodes and cathodes stacked together so that their top/bottom surfaces are adjacent to each other ("vertically aligned") to minimize the height of the assembly. It should be understood that the anodes and cathodes need not extend in the same direction. For example, the surface of one cathode may be provided in a plane that is substantially perpendicular to one direction, while the surface of another cathode may be provided in a plane that is substantially perpendicular to another direction. Desirably, however, the anodes/cathodes extend in substantially the same direction. Typically, an anode and corresponding cathode are separated by a distance of from about 10 micrometers to about 1000 micrometers.

Figure 5:
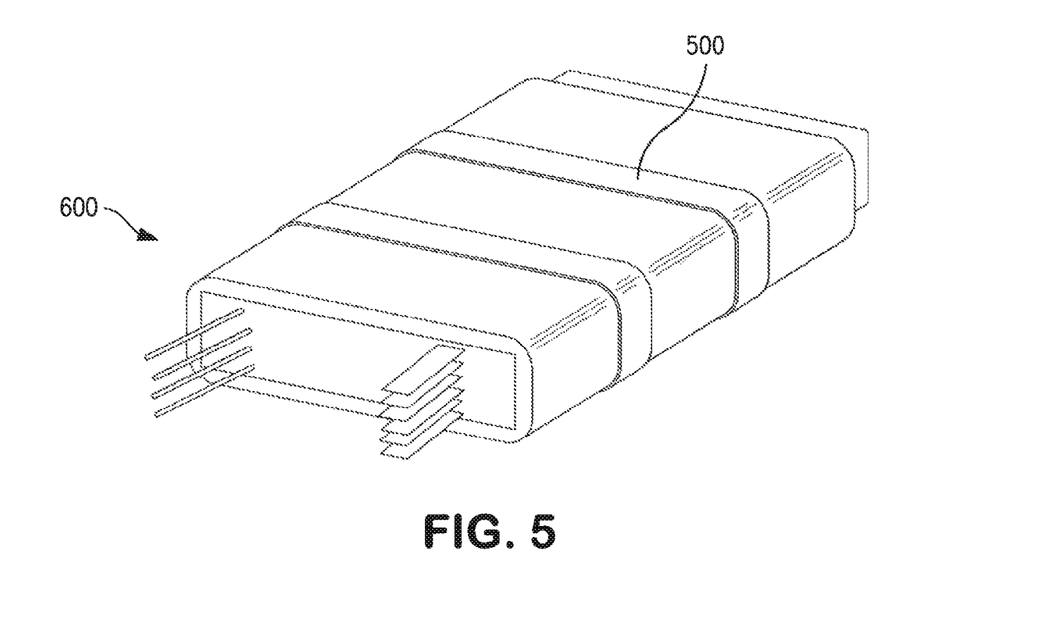
FIG. 5 illustrates the stack of FIG. 4 after it is pressed and finished.

Various stacked configurations may be employed for the capacitor. In one embodiment, for example, the anodes and cathodes may be in the form of substantially circular discs that are stacked so that a separator is positioned therebetween. Referring to FIGS. 4-7, yet another embodiment of a capacitor 300 is shown that includes a stack 400 of four (4) individual anodes (not shown) and five (5) individual cathodes (not shown). One or more of the anodes and/or cathodes may be formed from the wire assembly of the present invention. Separators may also be positioned between an anode and cathode to prevent direct contact therebetween, yet permit ionic current flow of the working electrolyte. Any material employed as a separator in known electrolytic-type may be used as a separator in the present invention. Suitable examples include, for instance, cellulosic webs, porous polymer materials (e.g., polypropylene, polyethylene, etc.), porous inorganic materials (e.g., fiberglass mats, porous glass, etc.), ion exchange resin materials, etc. Particular examples include ionic perfluoronated sulfonic acid polymer membranes (e.g., Nafion™ from the E.I. du Pont de Nemeours & Co.), sulphonated fluorocarbon polymer membranes, polybenzimidazole (PBI) membranes, and polyether ether ketone (PEEK) membranes. In the illustrated embodiment, for instance, inner separators 484 are interleaved between anodes and cathodes. Further, an outer separator 486 may also be wound around the entire stack of electrodes. Once formed, the resulting stack may be compressed in to the shape of a capacitor 600 (FIG. 5), such as shown by the directional arrow in FIG. 4. Further, as shown in FIG. 5, an adhesive or tape 500 may be applied around the compressed capacitor 600 so that it is able to maintain the desired shape.

Figure 6:
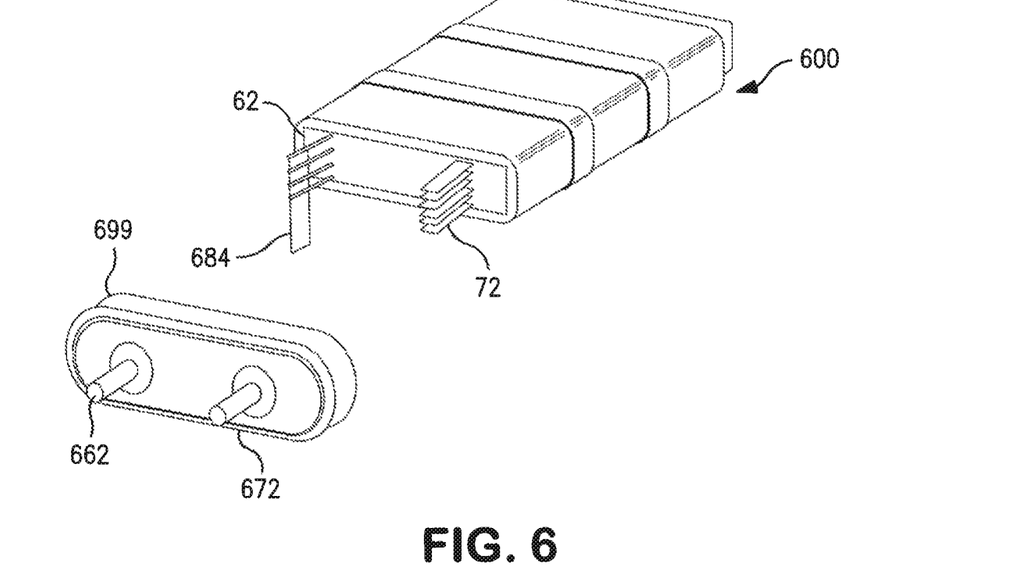
FIG. 6 illustrates one embodiment of an anode and cathode leads that may be electrically connected to the stacked capacitor of FIG. 5.

The individual anodes and cathodes may be electrically connected to respective cathode and anode terminations. The terminations serve as electrical connections for the capacitor and also help to stabilize the individual anodes and cathodes against movement. Any conductive material may be employed to form the terminations, such as a conductive material (e.g., tantalum, niobium, copper, nickel, silver, nickel, zinc, tin, palladium, lead, copper, aluminum, molybdenum, titanium, iron, zirconium, magnesium, and alloys thereof). Particularly suitable conductive metals include, for instance, nickel, niobium, and tantalum. The terminations may generally be arranged in any desired manner so that they are electrically isolated from each other and able to receive the individual capacitors. In FIG. 6, for instance, a capacitor assembly is shown that includes individual cathode leads 72 that are commonly connected to a cathode termination 672 (e.g., tantalum wire). Likewise, individual anode leads 62 are commonly connected to an anode termination 662 (e.g., tantalum wire). As shown, the terminations 672 and 662 may extend through an insert 699 that electrically isolates the terminations from each other. The cathode leads 72 and anode leads 62 may be electrically connected to the terminations 672 and 662, respectively, using any known technique. For example, the leads may be connected to the terminations either directly (e.g., laser welded, conductive adhesive, etc.) or via an additional conductive element (e.g., metal). In the illustrated embodiment, for instance, the anode leads 62 may be connected via a conductive tab 684. Although not shown, a similar tab may also be used to connect the cathode leads 72.

Figure 7:
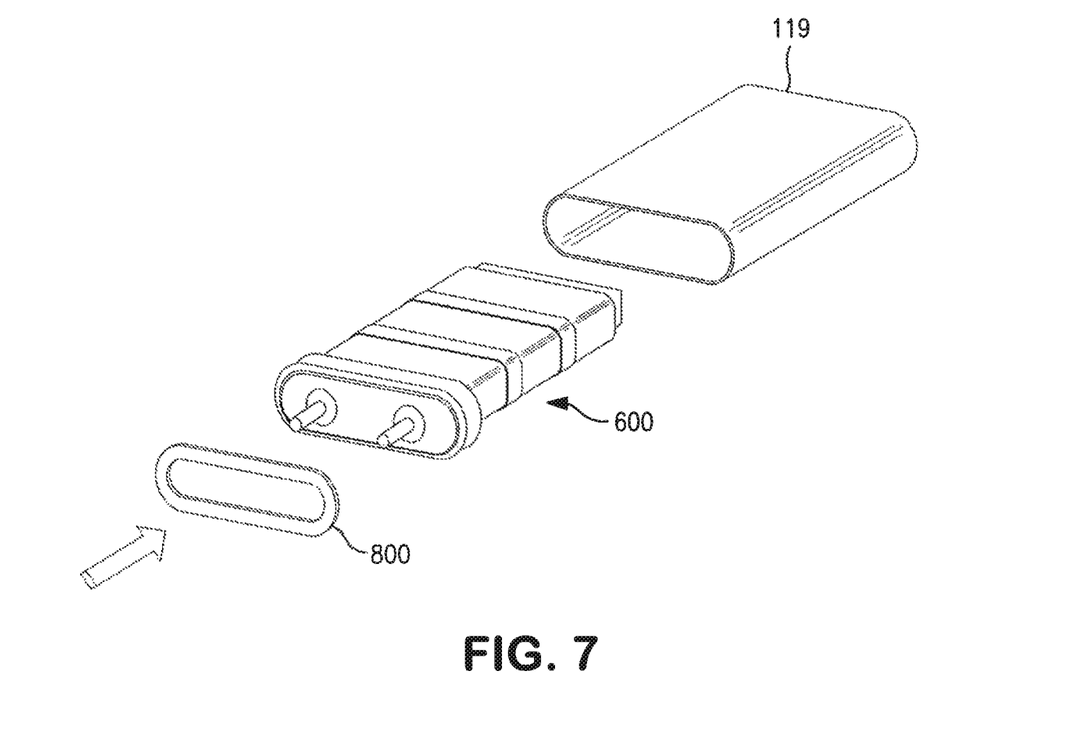
FIG. 7 illustrates one embodiment for sealing the stacked capacitor of FIG. 5 within a casing.

If desired, the components of the capacitor 600 may be encased within a container 119, such as shown in FIG. 7. The container 119 may be made from any of a variety of materials, such as copper, nickel, silver, nickel, zinc, tin, palladium, lead, copper, aluminum, molybdenum, titanium, iron, zirconium, magnesium, and alloys thereof. If desired, a sealing member 800 (e.g., rubber material) may also provide a hermetic seal. After assembly and sealing (e.g., welding), the electrolyte may optionally be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 $\mu F*V/cm^3$ to about 300,000 $\mu F*V/cm^3$, in some embodiments from about 60,000 $\mu F*V/cm^3$ to about 200,000 $\mu F*V/cm^3$, and in some embodiments, from about 80,000 $\mu F*V/cm^3$ to about 150,000 $\mu F*V/cm^3$, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 $\mu F$, which results in a product of 91,000 $\mu F*V$. If the part occupies a volume of about 0.8 $cm^3$, this results in a volumetric efficiency of about 113,750 $\mu F*V/cm^3$.

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 mF/cm², and in some embodiments, from about 8 to about 20 mF/cm². The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 500 milliohms, in some embodiments less than about 100 milliohms, in some embodiments less than about 50 milliohms, in some embodiments about 20 milliohms or less, and in some embodiments, from about 0.01 to about 10 milliohms, measured with a 2-volt bias and 1-volt signal at a frequency of 120 Hz or 100 kHz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F^*V$, in some embodiments less than about 0.5 $\mu A/\mu F^*V$, and in some embodiments, less than about 0.1 $\mu A/\mu F^*V$, where $\mu A$ is microamps and $\mu F^*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to micro-inverters; micro-UPS devices; medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

Example

Capacitor grade tantalum wire (diameter of 390 μm) was initially resistance welded to a frame having a size of 2 cm×4 cm. The frame was pressed with approximately 3 metric tons to relieve stress and achieve planarity, then roughened, and subjected to a 10% HF solution for 15 minutes to remove contaminates from the weld operation and to further roughen surface. A NH175 capacitor grade Ta powder was sieved to less than 25 μm and mixed with a 10% low carbon binder solution of QPAC-40 (Empower Inc.) and acetone. The powder/binder mixture was applied to the frame and pressed to form a green body. The green body was subjected to 70° C. for 180 minutes to remove solvent and then sintered in a vacuum furnace at 1600° C. for 30 minutes, including a debinder step at 350° C. for 240 minutes with an argon sweep. The sintered body maintained its pre-sintered planarity. The final body thickness measured was less than 0.6 mm. The sintered body was then subjected to a formation process utilizing a 4.5 mS/cm solution of phosphoric acid at 85° C. The body was formed to 20 Vf and held for a period of 90 minutes, then rinsed, and annealed for 1 Hr at 390° C. A second formation ensued for a period of 15 minutes. The body was then impregnated with 5M $H_2SO_4$ as an electrolyte and sandwiched between two cathode foils containing an electrochemically polymerized PEDT coating. Porous membranes of polypropylene were used as spacers between the electrodes to prevent direct short-circuit.

The capacitor assembly was subjected to capacitance and DC leakage measurements. The leakage current was 11 μA (300 sec RT at 14 V), the capacitance was 1530 μF (at 120 Hz), the single wire ESR was 52 mΩ (at 120 Hz) and 44 mΩ (at 100 kHz). A second connection was made to the first wire and ESR values were re-measured with the following results: the double wire ESR was 34 mΩ (at 120 Hz) and 24 mΩ (at 100 kHz).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode that includes a wire assembly containing two or more individual wires oriented in a first direction and two or more individual wires oriented in a second direction, the first direction not being equal to the second direction, wherein the two or more wires oriented in the first direction and the two or more wires oriented in the second direction are individually attached to a particulate material, wherein the particulate material is sintered and formed from a valve metal composition, and wherein the two or more wires oriented in the first direction and the two or more wires oriented in the second direction form a conductive mesh across a width and length of the anode;
   a cathode; and
   a fluidic working electrolyte in communication with the anode and the cathode.

2. The wet electrolytic capacitor of claim 1, wherein the wire assembly contains from 4 to 30 wires.

3. The wet electrolytic capacitor of claim 1, wherein the wires are formed from tantalum.

4. The wet electrolytic capacitor of claim 1, wherein the wires have a thickness of from about 20 micrometers to about 1000 micrometers and an aspect ratio of from about 2 to about 150.

5. The wet electrolytic capacitor of claim 1, wherein the angle defined between the first direction and the second direction is from about 20° to about 150°.

6. The wet electrolytic capacitor of claim 5, wherein the second direction is substantially perpendicular to the first direction.

7. The wet electrolytic capacitor of claim 5, wherein the wire assembly contains a group of first wires oriented in the first direction and a group of second wires oriented in the second direction.

8. The wet electrolytic capacitor of claim 7, wherein the second direction is substantially perpendicular to the first direction.

9. The wet electrolytic capacitor of claim 7, wherein the first wires are spaced apart in the second direction and the second wires are spaced apart in the first direction.

10. The wet electrolytic capacitor of claim 7, wherein the first wires are connected to the second wires at a plurality of contact points.

11. The wet electrolytic capacitor of claim 1, wherein the wire assembly is connected to an anode substrate, and wherein the particulate material is disposed over the anode substrate.

12. The wet electrolytic capacitor of claim 1, wherein the anode substrate is formed from tantalum.

13. The wet electrolytic capacitor of claim 1, wherein the valve metal composition contains tantalum.

14. The wet electrolytic capacitor of claim 1, wherein the anode further contains a dielectric that is formed through anodic oxidation of the particulate material.

15. The wet electrolytic capacitor of claim 1, wherein the cathode contains a cathode substrate that is coated with an electrochemically active material.

16. The wet electrolytic capacitor of claim 15, wherein the cathode substrate is connected to a wire assembly containing two or more individual wires.

17. The wet electrolytic capacitor of claim 15, wherein the electrochemically active material is disposed over the cathode substrate so that it is in contact with at least a portion of the wire assembly.

18. The wet electrolytic capacitor of claim 1, wherein an anode termination is connected to an anode lead of the anode and a cathode termination is connected to a cathode lead of the cathode.

19. The wet electrolytic capacitor of claim 18, wherein a wire of the wire assembly forms the anode lead.

20. The wet electrolytic capacitor of claim 1, wherein the wet electrolytic capacitor employs multiple anodes and multiple cathodes, wherein one or more of the anodes includes the wire assembly.

21. An electrode for a wet electrolytic capacitor, the electrode comprising a substrate connected to a wire assembly, the wire assembly containing a group of two or more first wires oriented in a first direction and a group of two or more second wires oriented in a second direction, the first direction not being equal to the second direction, wherein two or more of the first wires and two or more of the second wires are individually attached to a particulate material disposed over the substrate, wherein the particulate material is sintered and formed from a valve metal composition and wherein the first wires and the second wires form a conductive mesh across a width and length of the electrode.

22. The electrode of claim 21, wherein the wire assembly contains from 4 to 30 wires.

23. The electrode of claim 21, wherein the wires are formed from tantalum.

24. The electrode of claim 21, wherein the wires have a thickness of from about 20 micrometers to about 1000 micrometers and an aspect ratio of from about 2 to about 150.

25. The electrode of claim 21, wherein the second direction is substantially perpendicular to the first direction and wherein the first wires are connected to the second wires at a plurality of contact points.

* * * * *